(12) United States Patent
Chandrasekaran

(10) Patent No.: US 10,713,041 B1
(45) Date of Patent: Jul. 14, 2020

(54) APPLICATION CONFIGURATION MANAGER

(71) Applicant: Oracle International Corporation, Redwood Shores, CA (US)

(72) Inventor: Yuvaraj Chandrasekaran, Union City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/380,450

(22) Filed: Apr. 10, 2019

(51) Int. Cl.
- *G06F 9/44* (2018.01)
- *G06F 8/77* (2018.01)
- *G06F 16/955* (2019.01)
- *G06F 16/22* (2019.01)

(52) U.S. Cl.
CPC ............ *G06F 8/77* (2013.01); *G06F 16/221* (2019.01); *G06F 16/9566* (2019.01)

(58) Field of Classification Search
None
See application file for complete search history.

(56) References Cited

U.S. PATENT DOCUMENTS

| | | | |
|---|---|---|---|
| 7,257,705 B2 | 8/2007 | Flam et al. | |
| 7,389,314 B2 | 6/2008 | Kulkarni et al. | |
| 7,555,493 B2 | 6/2009 | Khayter et al. | |
| 8,719,782 B2 * | 5/2014 | DeHaan | G06F 9/45533 713/100 |
| 2009/0288068 A1 * | 11/2009 | Gunsel | G06F 8/36 717/116 |
| 2011/0107299 A1 * | 5/2011 | Dehaan | G06F 9/45533 717/121 |
| 2012/0102451 A1 * | 4/2012 | Kulkarni | G06F 8/24 717/102 |
| 2014/0143531 A1 * | 5/2014 | Lecler | G06F 9/3875 713/100 |
| 2014/0245077 A1 * | 8/2014 | Kanso | G06F 11/1482 714/47.3 |
| 2018/0060066 A1 * | 3/2018 | Rihani | G06F 8/71 |
| 2018/0136951 A1 * | 5/2018 | Palavalli | G06F 9/44505 |
| 2018/0136970 A1 * | 5/2018 | Nandagopal | H04L 67/1097 |

(Continued)

OTHER PUBLICATIONS

Oracle, "Configuring Applications for Production Deployment," Dec. 17, 2004 (Year: 2004).*

(Continued)

*Primary Examiner* — Insun Kang
(74) *Attorney, Agent, or Firm* — Invoke

(57) ABSTRACT

Techniques for configuring applications are disclosed. A system maps software development stages to respective stage-specific configurations in two or more sets of stage-specific configurations. The system selects a software development stage for configuring an instance of an application. Responsive to selection of the software development stage, the system configures the instance of the application based at least on: a stage-specific configuration, in a set of stage-specific configurations, corresponding to the software development stage; and another stage-specific configuration, in another set of stage-specific configurations, corresponding to the software development stage. The system executes the instance of the application based at least on the stage-specific configurations from the sets of stage-specific configurations.

20 Claims, 7 Drawing Sheets

(56) References Cited

U.S. PATENT DOCUMENTS

2018/0217824 A1* 8/2018 Kasthuri .................. G06F 8/41
2019/0294519 A1* 9/2019 Garg .................. G06F 11/3034
2019/0312800 A1* 10/2019 Schibler ............. H04L 41/0823

OTHER PUBLICATIONS

Oracle, "Managing Multiple Environments from Development to Production," web archive, May 9, 2015 (Year: 2015).*
Using different Web.config in development and production environment, https://stackoverflow.com/questions/305447/using-different-web-config-in-development-andproduction-environment, 2 pages, Nov. 2008.
Updating Hard-Coded References, Salesforce, 7 pages, May 31, 2018.
Promoting Jira configuration from development to production, Administering Jira applications Support Documentation, Atlassian, https://confluence.atlassian.com/adminjiraserver/promoting-jira-configuration-fromdevelopment-to-production-938847942.html, 12 pages, Aug. 2018.
Petrov, Integrity Check, Configuration Manager for Jira/User's Guide, https://botronsoft.atlassian.net/wiki/spaces/CMJ/pages/8257541/Integrity+Check, 7 pages, Jul. 2019.
Managing Multiple Environments from Development to Production, Warehouse Builder Installation and Administration Guide, 15 pages, Oracle, 2019.
Biswas, How to manage different environments and configurations for iOS projects, Freecodecamp.org, 12 pages, Nov. 2017.

* cited by examiner

APPLICATION CONFIGURATION MANAGER

TECHNICAL FIELD

The present disclosure relates to applications. In particular, the present disclosure relates to application configurations.

BACKGROUND

A software development lifecycle for an application typically proceeds in stages. In a development stage, programmers design and write the application's code. In a testing stage, programmers and/or other individuals (e.g., quality assurance engineers, end users subscribed to a beta program, etc.) test the application to determine whether it operates as expected. In a staging stage, the application is deployed to a staging environment that fully or approximately replicates a production ('live') environment. Additional testing may be performed in the staging environment. In a production stage, the application is 'live', i.e., accessible to the intended end users. Some software development lifecycles may include more or fewer stages than those described above. Two or more software development stages may operate simultaneously. For example, while an application is already live in a production environment, developers may work on fixes and/or upgrades to the application in a development environment.

During a software development lifecycle, data may be copied or migrated from one software development stage to another. As an example, when an application goes live, data may be migrated from a staging environment to a production environment. As another example, data may be migrated from a production environment to a non-production environment (e.g., development, testing, staging, and/or any other non-production environment). Data may be migrated between different instances of the same application that are configured to execute, respectively, in the different environments corresponding to the different software development stages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. MANAGING APPLICATION CONFIGURATIONS
4. ILLUSTRATIVE EXAMPLES
4.1. CONFIGURATION MAPPINGS
4.2. STAGE-SPECIFIC APPLICATION CONFIGURATIONS
4.3. MIGRATING A DATABASE
5. MISCELLANEOUS; EXTENSIONS
6. HARDWARE OVERVIEW
7. COMPUTER NETWORKS AND CLOUD NETWORKS
8. MICROSERVICE APPLICATIONS

1. GENERAL OVERVIEW

A software development lifecycle includes various different software development stages. As an example, software development stages may include a development stage, a testing stage, and a production stage. An application instance may be configured for execution according to a particular one of the software development stages. Configuring an application instance may include extracting multiple stage-specific configurations from respective sets of stage-specific configurations. Each extracted stage-specific configuration for use in configuring an application instance corresponds to a same particular selected software development stage.

One or more embodiments select a software development stage for configuring an application instance. One or more embodiments map the software development stage to a stage-specific configuration, of a set of stage-specific configurations. Multiple instances of the same mapping scheme determine multiple stage-specific configurations from respective sets of stage-specific configurations. Extracting multiple stage-specific configurations based on a single selection of a particular software development stage is more efficient than hard-coding an individual reference to each of the multiple stage-specific configurations. Furthermore, a system may configure an application instance according to a different software development stage by simply selecting a different software development stage used in configuring the application instance.

One or more embodiments described in this Specification and/or recited in the claims may not be included in this General Overview section.

2. ARCHITECTURAL OVERVIEW

Figure 1:
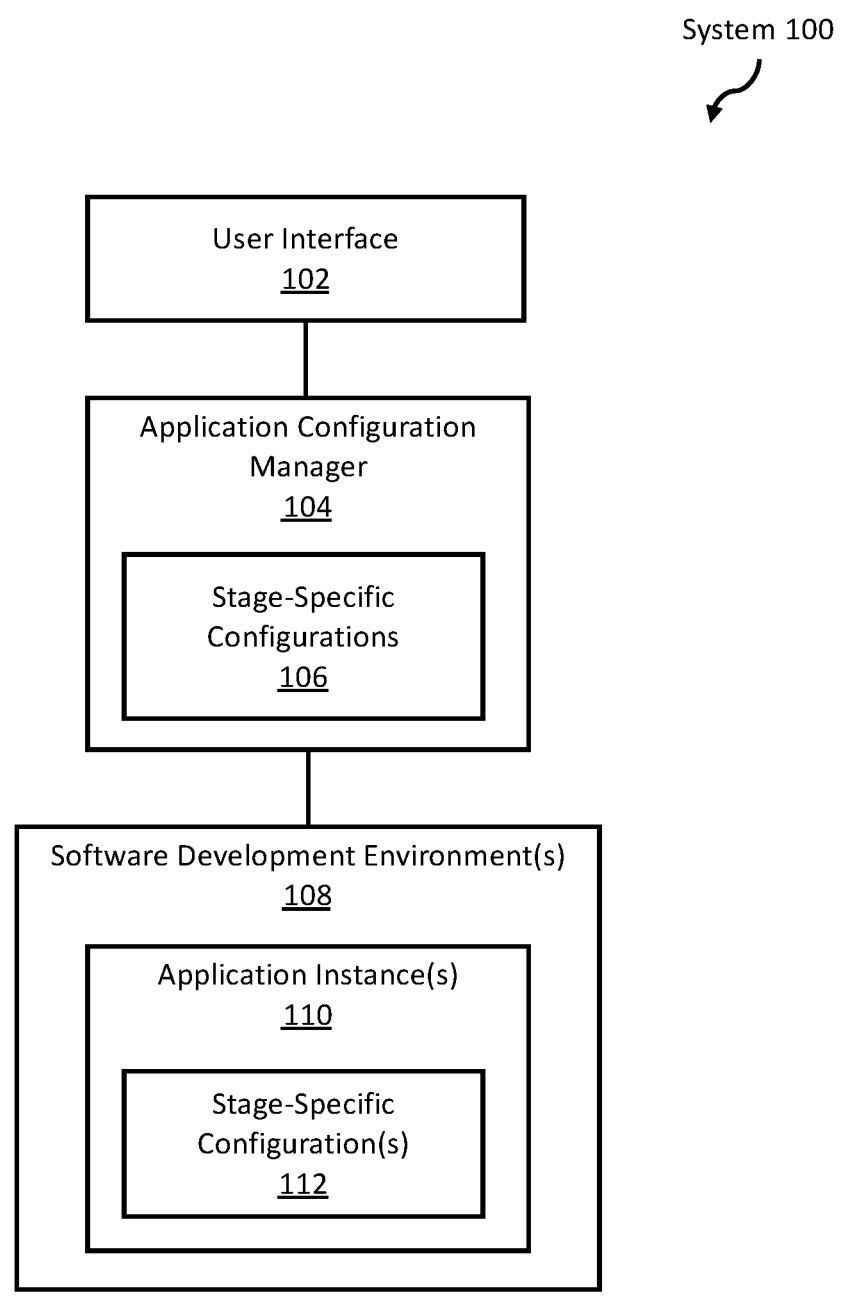
FIG. 1 illustrates a system in accordance with one or more embodiments.

FIG. 1 illustrates a system 100 in accordance with one or more embodiments. As illustrated in FIG. 1, system 100 includes a user interface 102, application configuration manager 104, a data repository 114, one or more software development environments 108, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a user interface 102 refers to hardware and/or software configured to facilitate communications between a user and an application configuration manager 104. User interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 102 is specified in one or more other languages, such as Java, C, or C++.

In an embodiment, an application configuration manager 104 refers to hardware and/or software configured to perform operations described herein for managing application configurations. Examples of operations for managing application configurations are described below. The application configuration manager 104 may be configured to manage application configurations based at least on user input received from a user interface 102. Alternatively or additionally, the application configuration manager 104 may be configured to manage application configurations using stage-specific configurations 106 stored in a data repository 114 and/or elsewhere in the system 100.

In an embodiment, stage-specific configurations 106 are configurations that apply, respectively, to specific software development stages of the same application. Specifically, stage-specific configurations 106 may include configurations that are different for different software development stages. As one example, an application may use different uniform resource locators (URL's) in production and in testing. In production, the application may use a URL that references a web page on a production server. In testing, the application may use a URL that references a web page on a test server.

As another example, an application may use different datasets and/or subsets thereof (e.g., files, directories, database tables, columns, extensible markup language (XML) entries, and/or any other kind of dataset or combination thereof) in production and in testing. In production, the application may use a database table and/or table column that stores production data (e.g., actual, current customer data). In testing, the application may use a database table and/or table column that stores test data (e.g., hypothetical and/or out-of-date customer data). An application may be configured to generate, at runtime, a database query (e.g., a structured query language (SQL) query, a multidimensional database expression (MDX), and/or another kind of database query) based on a stage-specific configuration 106, such that the SQL query varies between different software development stages. A software development stage may explicitly include a database component (e.g., table or column) that is not included (by omission or explicit exclusion) in another software development stage. Alternatively or additionally, a software development stage may explicitly exclude a database component that is included (explicitly or by default) in another software development stage.

As another example, an application may store different user roles between different software development stages. User roles that are provisioned in a production environment may be ignored in a test environment (e.g., by storing the user roles in different tables and/or columns), and/or vice versa. While the preceding examples refer to testing and production, many different stage-specific configurations may apply to any software development stage(s), not limited to the preceding examples and not limited to testing and production. In an embodiment, the stage-specific configurations 106 include mappings between different software development stages and corresponding configurations that apply to those software development stages. Some examples of configuration mappings are described below.

In an embodiment, a data repository 114 is any type of storage unit and/or device (e.g., a file system, database, collection of tables, or any other storage mechanism) for storing data. Further, a data repository 114 may include multiple different storage units and/or devices. The multiple different storage units and/or devices may or may not be of the same type or located at the same physical site. Further, a data repository 114 may be implemented or may execute on the same computing system as one or more other components of the system 100. Alternatively or additionally, a data repository 114 may be implemented or executed on a computing system separate from one or more other components of the system 100. A data repository 114 may be communicatively coupled to one or more other components of the system 100 via a direct connection or via a network.

Information describing stage-specific configurations 106 may be implemented across any of components within the system 100. However, this information is illustrated within the data repository 114 for purposes of clarity and explanation.

In an embodiment, the application configuration manager 104 is configured to manage application configurations for one or more software development environments 108. A software development environment 108 is a set of hardware and/or software that supports an application instance 110. The application instance 110 is an instance of a particular application, configured for a particular software development stage. The application instance 110 may be an instance of: a stand-alone application; a software-as-a-service (SaaS) application; a database; a backend application (e.g., a service) that supports a frontend application; and/or any other kind of application or combination thereof. For example, one software development environment 108 may be a testing environment that includes an application instance 110 used to test an application. Another software development environment 108 may be a production environment that includes an application instance 110 corresponding to a 'live' version of the application. Multiple software development environments 108 may include support different application instances 110, corresponding to different software development stages of the same application. In an embodiment, the application configuration manager 104 configures an application instance 110 using one or more stage-specific configurations 112 that is/are appropriate for the particular software development environment 108 in which the application instance 110 is configured.

In an embodiment, components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. MANAGING APPLICATION CONFIGURATIONS

Figure 2:
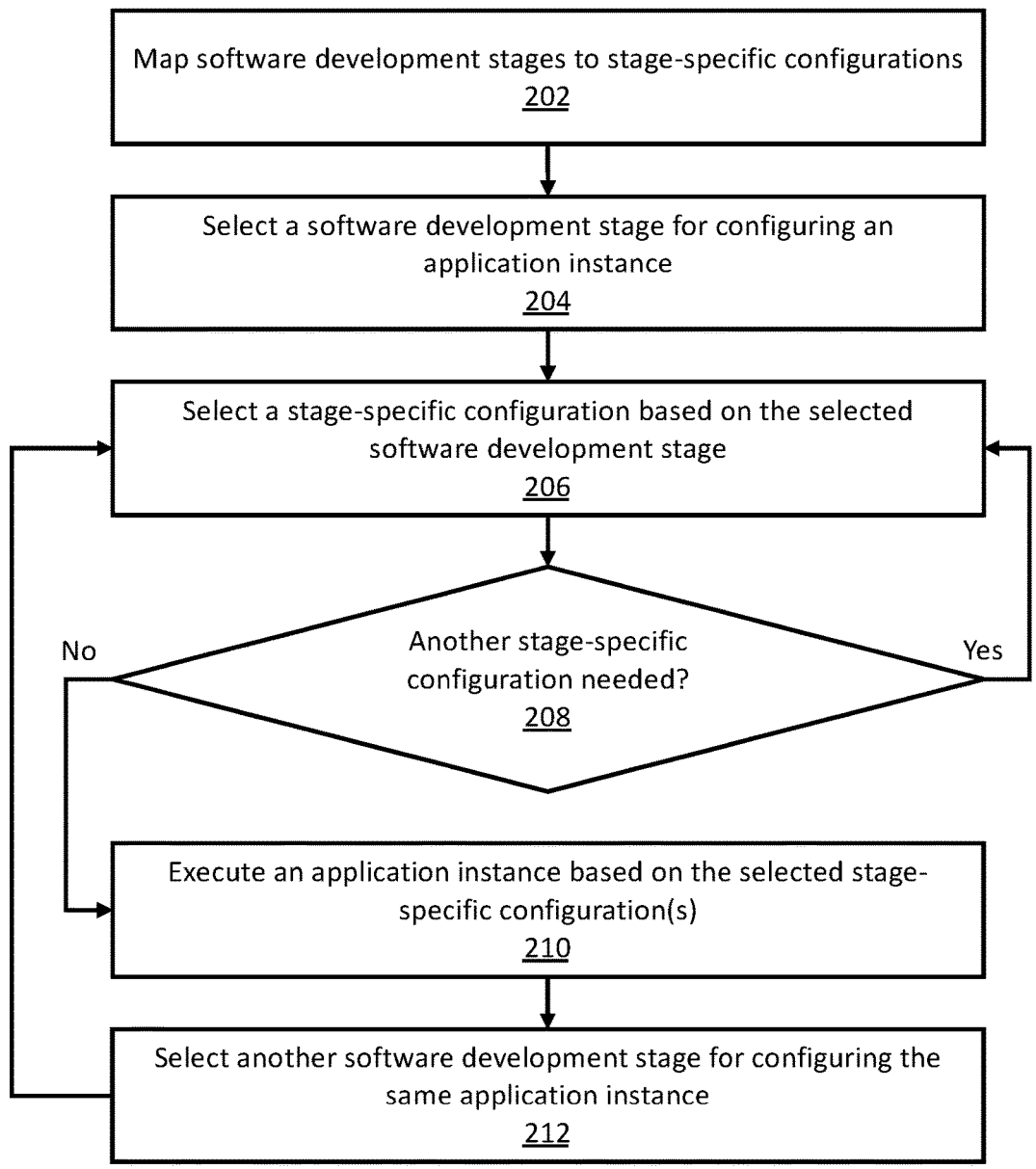
FIG. 2 illustrates a set of operations for managing application configurations in accordance with one or more embodiments.

FIG. 2 illustrates a set of operations for managing application configurations in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., system 100 of FIG. 1) maps software development stages to stage-specific configurations (Operation 202). To map software development stages to stage-specific configurations, the system stores configuration data that allows the system to look up, generate, and/or otherwise determine a stage-specific configuration applicable to a given software development stage. For each software development stage, a corresponding application instance uses the stage-specific configuration mapped to that software development stage. As an example, for an application that includes a URL, the system may map different software development stages, respectively, to different URL's. As another example, for an application that stores data in a database table, the system may map different software development stages, respectively, to different database table names. As another example, the system may map different software development stages, respectively, to different database table columns.

In an embodiment, to map software development stages to corresponding stage-specific configurations, the system stores tabular data (e.g., in a database table, spreadsheet, and/or any other tabular data format or combination thereof) in which one column indicates a software development stage and another column indicates a corresponding stage-specific configuration. Alternatively or additionally, the system may store stage-specific configurations separately for each software development stage, with each stage-specific configuration keyed to a particular configuration name/identifier. Alternatively or additionally, the system may store partial configuration values and stage-specific modifiers. A partial configuration value may be identical across all software development stages. The partial configuration value may not, by itself, represent a complete configuration. The partial configuration value may be a regular expression with a fixed part and a variable part, where the variable part changes from one software development stage to the next. The regular expression may include a default value for the variable part. The system may also store stage-specific modifiers (e.g., prefixes, suffixes, variable values, and/or another form of modifier or combination thereof) associated with different software development stages. Alternatively or additionally, a stage-specific modifier may be used as a prefix, suffix, or other modifier of a partial configuration value that is not a regular expression. In general, in an embodiment, combining a stage-specific modifier with a partial configuration value generates a corresponding stage-specific configuration. The system may map software development stages to stage-specific configurations in many different ways. Some examples of configuration mappings are described in further detail below.

In an embodiment, the system selects a software development stage for configuring an application instance (Operation 204). The system may select the software development stage responsive to user input (e.g., via user interface 102 of FIG. 1) indicating the software development stage. Alternatively or additionally, the system may select the software development stage based on data associated with a software development environment. The system may read data (e.g., a server name, an environment variable, and/or any other kind of data that may differ between software development environments) from the software development environment and select the software development stage based on the data. For example, a testing environment may include one or more servers in a particular domain that is not exposed to end users, while a production environment includes one or more servers in a particular domain that is exposed to end users. The system may select the software development stage, based on the software development environment, in many different ways.

In an embodiment, the system selects a stage-specific configuration based on the selected software development stage (Operation 206). Specifically, the system uses a configuration mapping to look up (e.g., in tabular data), generate (e.g., using a, and/or otherwise determine the stage-specific configuration applicable to the selected software development stage. In an embodiment, configuring a particular application instance uses multiple stage-specific configurations. The system may determine whether another stage-specific configuration is needed for the application instance to be configured (Operation 208). If another stage-specific configuration is needed, the system may also select that stage-specific configuration based on the selected software development stage (Operation 206). The system may select any number of stage-specific configurations, used to configure a particular application instance, based on the selected software development stage.

In an embodiment, the system executes an application instance based on the selected stage-specific configuration(s) (Operation 210). Specifically, when the system executes the application instance, one or more configurations in the application instance is/are the stage-specific configuration(s) applicable to the software development stage selected for that application instance. In this manner, the system applies the correct stage-specific configurations for the software development environment in which the application instance is executing. At the time when the system selects the stage-specific configuration(s) for the application instance, the application instance may not already be running. In this case, to execute the application instance, the system may initialize the application instance and apply the stage-specific configuration(s) before, during, and/or after initialization. Alternatively, at the time when the system selects the stage-specific configuration(s) for the application instance, the application instance may already be running. In this case, to execute the application instance, the system may apply the stage-specific configuration(s) to the already-running application instance. The system may restart the application instance to apply one or more stage-specific configuration(s).

In an embodiment, an application instance that has already been configured for a particular software development stage (i.e., using a corresponding set of one or more stage-specific configurations) can be reconfigured for a different software development stage. The system may select another software development stage for configuring the same application instance (Operation 212). Based on the selection, the system may repeat the process of selecting one or more corresponding stage-specific configurations (Operations 206-208) and execute the application instance based on the selected stage-specific configuration(s) (Operation 210). In this manner, the system may be able to efficiently migrate a software development environment from one software development stage to another software development stage, changing any number of stage-specific configurations based on the selected software development stage.

Application configuration techniques described herein may the amount of time and effort needed to configure application instances for different software development stages, when compared with manual techniques and other techniques that do not use mappings of software development stages to stage-specific configurations. Alternatively or additionally, application configuration techniques described herein may improve the accuracy of configuring application instances, by eliminating or reducing the need for manual interventions. When migrating an application from one software development stage to another, application configuration techniques described herein may reduce downtime.

4. ILLUSTRATIVE EXAMPLES

Detailed examples are described below for purposes of clarity. Components and/or operations described below should be understood as specific examples which may not be applicable to certain embodiments. Accordingly, components and/or operations described below should not be construed as limiting the scope of any of the claims.

4.1. Configuration Mappings

Figure 3:
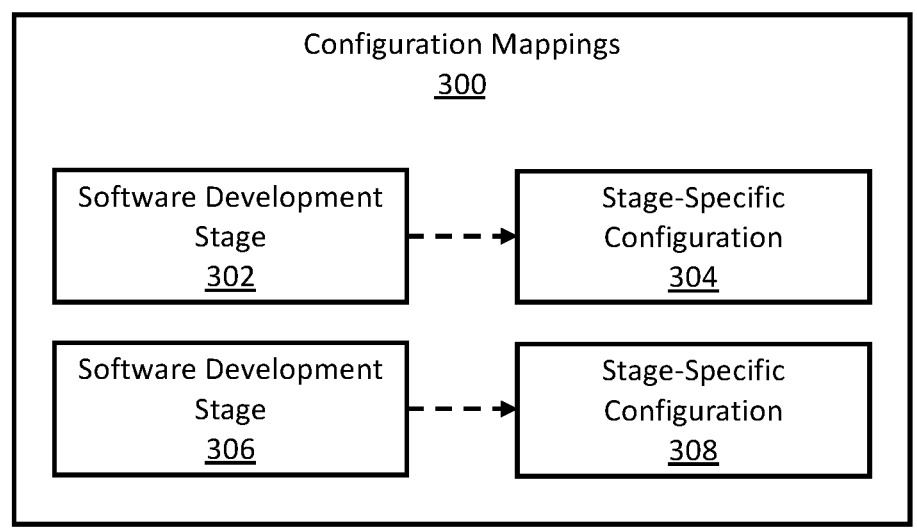
FIG. 3 illustrates an example of configuration mappings in accordance with one or more embodiments.

FIG. 3 illustrates an example of configuration mappings 300 in accordance with one or more embodiments. In this example, the configuration mappings 300 include software development stages 302, 306 that each are mapped to corresponding stage-specific configurations 304, 308. For example, the configuration mappings 300 may be stored in tabular format, as represented in the example table below. In the following table, the values in brackets represent the server domains (not shown) in the corresponding software development environments. In this example, stage-specific configurations are further associated with configuration identifiers, which uniquely identify different configurations within the application that may vary between software development stages:

| Stage | Configuration Identifier | Stage-Specific Configuration |
|---|---|---|
| Development | URL_A | https://[dev-domain]/a.html |
| Testing | URL_A | https://[test-domain]/a.html |
| Staging | URL_A | https://[staging-domain]/a.html |
| Production | URL_A | https://[prod-domain]/a.html |
| Development | URL_B | https://[dev-domain]/b.html |
| Testing | URL_B | https://[test-domain]/b.html |
| Staging | URL_B | https://[staging-domain]/b.html |
| Production | URL_B | https://[prod-domain]/b.html |

Figure 4:
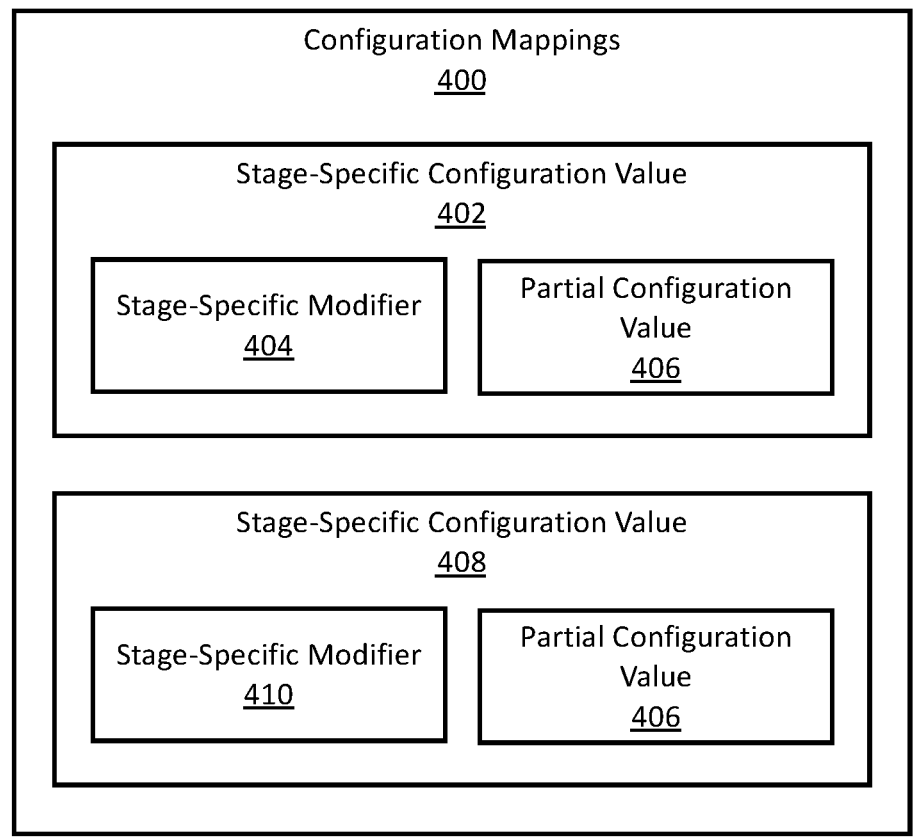
FIG. 4 illustrates an example of configuration mappings in accordance with one or more embodiments.

FIG. 4 illustrates an example of configuration mappings 400 in accordance with one or more embodiments. In this example, different stage-specific configuration values 402, 408 are based on the same partial configuration value 406. To map each software development stage to the corresponding stage-specific configuration values 402, 408, the system combines stage-specific modifiers 404, 410 with the partial configuration value 406. The following table shows an example of stage-specific modifiers, for different software development stages, being combined with the same partial configuration value to obtain complete stage-specific configurations. In this example, the stage-specific configurations correspond to different table names within a database:

| Modifier | Partial Configuration Value | Stage-Specific Configuration |
|---|---|---|
| dev | $1-customer-data | dev-customer-data |
| test | $1-customer-data | test-customer-data |
| staging | $1-customer-data | staging-customer-data |
| prod | $1-customer-data | prod-customer-data |

4.2. Stage-Specific Application Configurations

Figure 5:
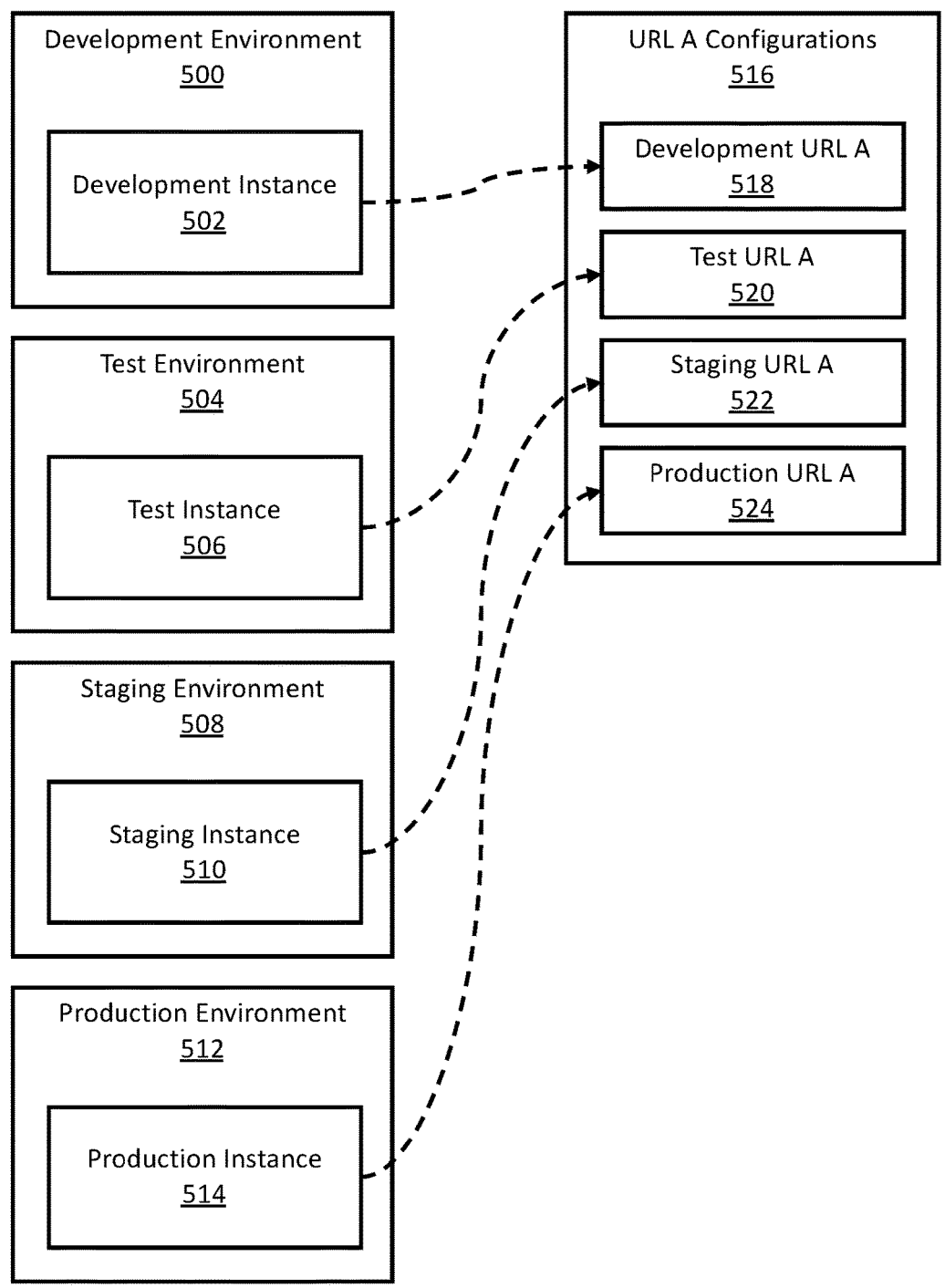
FIG. 5 illustrates an example of stage-specific application configurations in accordance with one or more embodiments.

FIG. 5 illustrates an example of stage-specific application configurations in accordance with one or more embodiments. Specifically, FIG. 5 illustrates four different software development environments, corresponding to different software development stages. Each software development environment includes a different instance of the same application, configured for that software development environment. A development environment 500 includes a development instance 502; a test environment 504 includes a test instance 506; a staging environment 508 includes a staging instance 510; and a production environment 512 includes a production instance 514. In this example, the application uses a particular URL ("URL A") that is different for each software development stage. URL A configurations 516 are stage-specific configurations mapped to each software development stage, respectively. Thus, development instance 502 is configured to use development URL A 518; test instance 506 is configured to use test URL A 520; staging instance 510 is configured to use staging URL A 522; and production instance 514 is configured to use development URL A 524. Each application instance also may be configured to use any number of additional stage-specific configurations not shown in FIG. 5.

4.3. Migrating a Database

Figure 6:
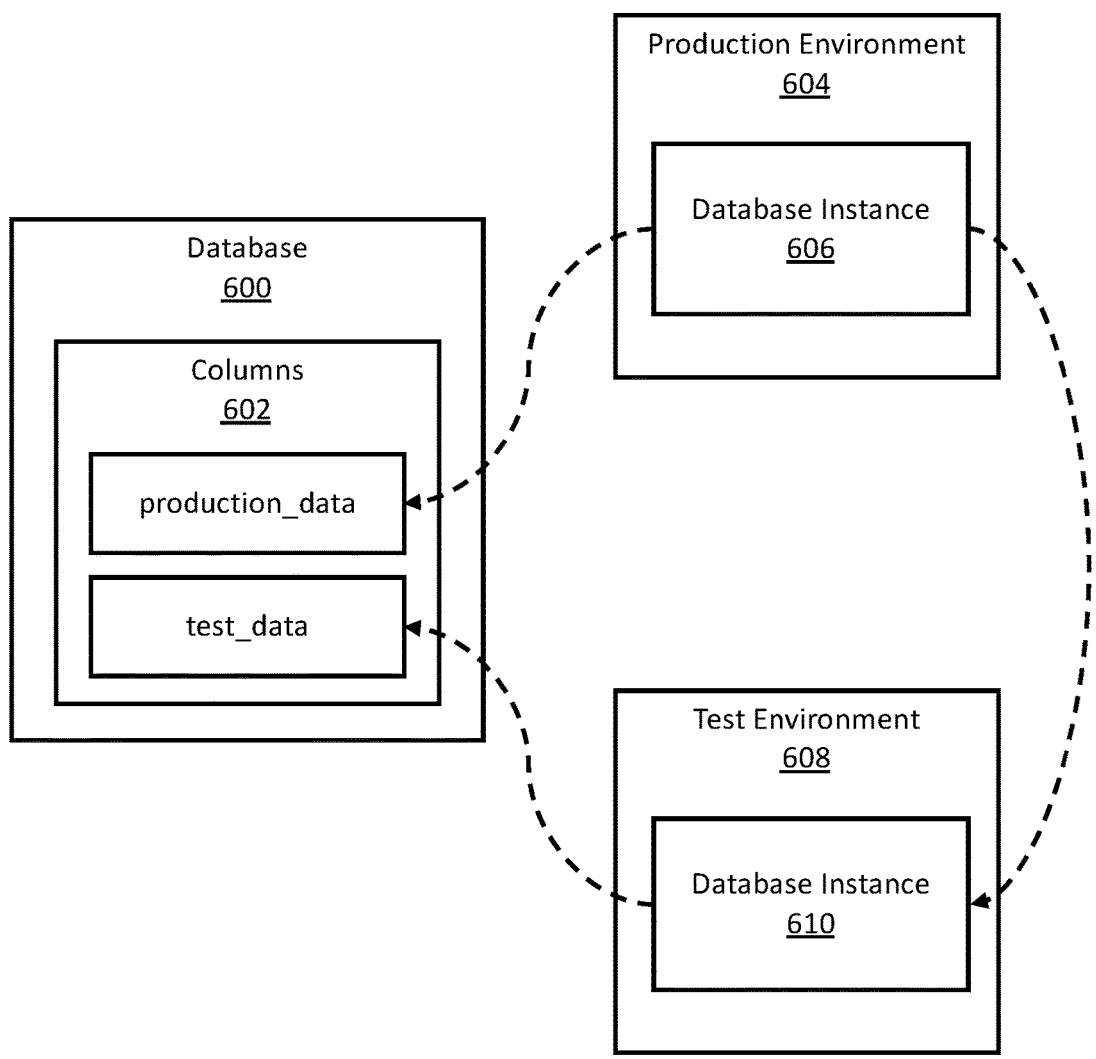
FIG. 6 illustrates an example of migrating a database in accordance with an embodiment.

In an embodiment, a system uses techniques for managing application configurations, as described herein, to efficiently migrate an application from one software development environment to another software development environment. FIG. 6 illustrates an example of migrating a database in accordance with an embodiment. In this example, a database 600 stores stage-specific configurations. Specifically, the database maps different software development stages to database columns 602. The database columns 602 may be columns of the same database table, where different instances of the database use different columns based on their respective stage-specific configurations. In this example, a production environment 604 includes a production database instance 606 that is configured to use the production_data column. During operation of the production database instance 606, the production_data column may be populated with private and/or sensitive customer data. A test environment 608 includes a testing database instance 610 that uses the test_data column rather than the production_data column. Using the test_data column rather than the production_data column helps avoid exposing private and/or sensitive customer data to unauthorized users or entities. To migrate the database from the production environment 604 to the test environment 608 (a process that may be referred to as a production refresh to a non-production environment), the system may copy the entire production database instance 606 from the production environment 604 to the test environment 608 (making the copy the testing database instance 610), or copy data from the production database instance 606 to an existing testing database instance 610. Database instance 610 may require reconfiguration after the migration operation. Because the testing database instance 610 is configured to use the stage-specific configuration (i.e., the table column) applicable to the test environment 608, migrating the database does not expose data from the production_data column to users of the testing database instance 610.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
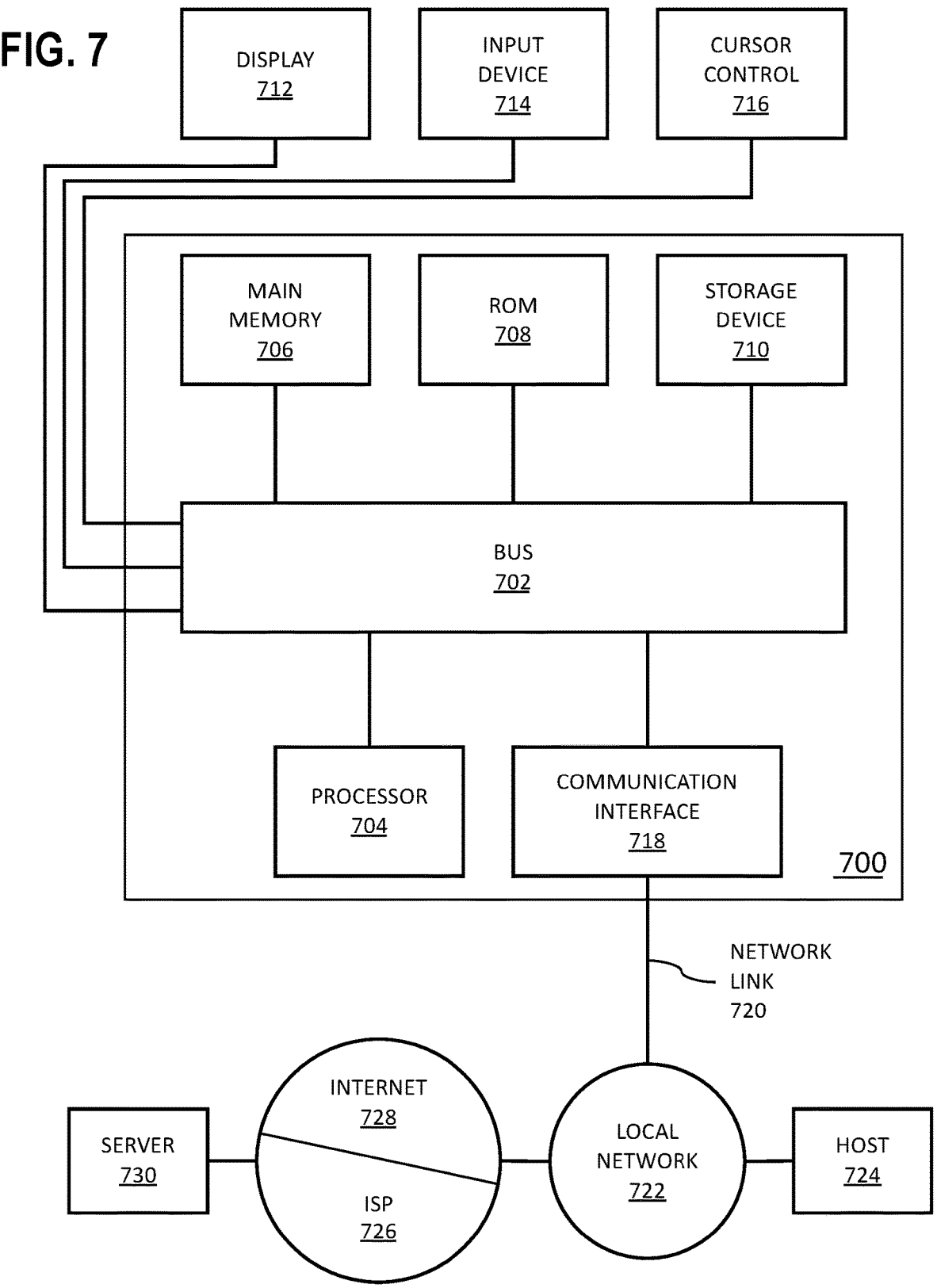
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. COMPUTER NETWORKS AND CLOUD NETWORKS

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    mapping a plurality of software development stages to respective stage-specific configurations in a first plurality of stage-specific configurations;

mapping the plurality of software development stages to respective stage-specific configurations in a second plurality of stage-specific configurations;

selecting a first software development stage, of the plurality of software development stages, for configuring a first instance of an application;

responsive to selection of the first software development stage, configuring the first instance of the application based at least on:
- a first stage-specific configuration, of the first plurality of stage-specific configurations, corresponding to the first software development stage;
- a second stage-specific configuration, of the second plurality of stage-specific configurations, corresponding to the first software development stage;

executing the first instance of the application based at least on the first stage-specific configuration of the first plurality of stage-specific configurations and the second stage-specific configuration of the second plurality of stage-specific configurations.

2. The one or more media of claim 1, further storing instructions which, when executed by one or more processors, cause:

selecting a second software development stage, of the plurality of software development stages, for configuring the first instance of the application;

responsive to selection of the second software development stage, configuring the first instance of the application based at least on:
- a third stage-specific configuration, of the first plurality of stage-specific configurations, corresponding to the second software development stage;
- a fourth stage-specific configuration, of the second plurality of stage-specific configurations, corresponding to the second software development stage;

executing the first instance of the application based at least on the third stage-specific configuration of the first plurality of stage-specific configurations and the fourth stage-specific configuration of the second plurality of stage-specific configurations.

3. The one or more media of claim 1, further storing instructions which, when executed by one or more processors, cause:

selecting a second software development stage, of the plurality of software development stages, for configuring a second instance of the application;

responsive to selection of the second software development stage, configuring the second instance of the application based at least on:
- a third stage-specific configuration, of the first plurality of stage-specific configurations, corresponding to the second software development stage;
- a fourth stage-specific configuration, of the second plurality of stage-specific configurations, corresponding to the second software development stage;

executing the second instance of the application based at least on the third stage-specific configuration of the first plurality of stage-specific configurations and the fourth stage-specific configuration of the plurality of stage-specific configurations.

4. The one or more media of claim 1:
wherein the first stage-specific configuration identifies a first subset of a dataset to use in the first instance of the application;
wherein a third stage-specific configuration in the first plurality of stage-specific configurations identifies a second subset of the dataset that is different from the first subset of the dataset.

5. The one or more media of claim 4:
wherein the dataset is a database;
wherein the first subset of the database explicitly includes a database column that is not included in the second subset of the database.

6. The one or more media of claim 5:
wherein the first software development stage corresponds to a non-production software development stage and the second subset of the database is associated with a production software development stage;
wherein the database column explicitly included in the first subset of the database and not included in the second subset of the database is configured to store test data.

7. The one or more media of claim 4:
wherein the dataset is a database;
wherein the first subset of the database explicitly excludes one or more of a database column or a database table that is not excluded from the second subset of the dataset.

8. The one or more media of claim 7:
wherein the first software development stage corresponds to a non-production software development stage and the second subset of the database is associated with a production software development stage;
wherein the database column explicitly excluded from the first subset of the database and not excluded from the second subset of the database is configured to store production_data.

9. The one or more media of claim 1:
wherein the first instance of the application is a database instance.

10. The one or more media of claim 1:
wherein the first plurality of stage-specific configurations comprises a first plurality of uniform resource locators (URL's) associated, respectively, with the plurality of software development stages;
wherein the second plurality of stage-specific configurations comprises a second plurality of URL's associated, respectively, with the plurality of software development stages.

11. The one or more media of claim 1:
wherein mapping a particular software development stage in the plurality of software development stages to a respective stage-specific configuration in the first plurality of stage-specific configurations comprises:
combining a stage-specific modifier, associated with the particular software development stage, with a partial configuration value to obtain a complete stage-specific configuration value corresponding to the respective stage-specific configuration.

12. The one or more media of claim 11:
wherein the partial configuration value comprises a regular expression;
wherein combining the stage-specific modifier with the partial configuration value comprises substituting the stage-specific modifier for a variable portion of the regular expression.

13. The one or more media of claim 11:
wherein the partial configuration value is a partial uniform resource locator (URL);

wherein the complete stage-specific configuration value is a complete URL corresponding to the respective stage-specific configuration.

14. The one or more media of claim 11:
wherein the partial configuration value is a partial database table name;
wherein the complete stage-specific configuration value is a complete database table name corresponding to the respective stage-specific configuration.

15. The one or more media of claim 1:
wherein selecting the first software development stage is responsive to user input designating the first software development stage.

16. The one or more media of claim 1:
wherein selecting the first software development stage is responsive to detecting an environment in which the first instance of the application is to be configured.

17. The one or more media of claim 1:
wherein executing the first instance of the application based at least on the first stage-specific configuration of the first plurality of stage-specific configurations and the second stage-specific configuration of the plurality of stage-specific configurations comprises:
instantiating the first instance of the application.

18. The one or more media of claim 1:
wherein executing the first instance of the application based at least on the first stage-specific configuration of the first plurality of stage-specific configurations and the second stage-specific configuration of the plurality of stage-specific configurations comprises:
applying the first stage-specific configuration and the second stage-specific configuration while the first instance of the application is already executing.

19. A system comprising:
at least one device including a hardware processor;
the system being configured to perform operations comprising:
mapping a plurality of software development stages to respective stage-specific configurations in a first plurality of stage-specific configurations;
mapping the plurality of software development stages to respective stage-specific configurations in a second plurality of stage-specific configurations;
selecting a first software development stage, of the plurality of software development stages, for configuring a first instance of an application;
responsive to selection of the first software development stage, configuring the first instance of the application based at least on:
a first stage-specific configuration, of the first plurality of stage-specific configurations, corresponding to the first software development stage;
a second stage-specific configuration, of the second plurality of stage-specific configurations, corresponding to the first software development stage;
executing the first instance of the application based at least on the first stage-specific configuration of the first plurality of stage-specific configurations and the second stage-specific configuration of the second plurality of stage-specific configurations.

20. A method comprising:
mapping a plurality of software development stages to respective stage-specific configurations in a first plurality of stage-specific configurations;
mapping the plurality of software development stages to respective stage-specific configurations in a second plurality of stage-specific configurations;
selecting a first software development stage, of the plurality of software development stages, for configuring a first instance of an application;
responsive to selection of the first software development stage, configuring the first instance of the application based at least on:
a first stage-specific configuration, of the first plurality of stage-specific configurations, corresponding to the first software development stage;
a second stage-specific configuration, of the second plurality of stage-specific configurations, corresponding to the first software development stage;
executing the first instance of the application based at least on the first stage-specific configuration of the first plurality of stage-specific configurations and the second stage-specific configuration of the second plurality of stage-specific configurations,
wherein the method is performed by at least one device comprising a hardware processor.

* * * * *